(12) United States Patent
Padmanabhan et al.

(10) Patent No.: US 7,529,666 B1
(45) Date of Patent: May 5, 2009

(54) MINIMUM BAYES ERROR FEATURE SELECTION IN SPEECH RECOGNITION

(75) Inventors: Mukund Padmanabhan, White Plains, NY (US); George A. Saon, Putnum Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 09/699,894

(22) Filed: Oct. 30, 2000

(51) Int. Cl.
*G10L 15/08* (2006.01)

(52) U.S. Cl. .................. 704/240; 704/245; 704/236; 704/231; 704/255

(58) Field of Classification Search ............... 704/240, 704/231, 243, 238, 245, 236, 255; 706/10, 706/12
See application file for complete search history.

(56) References Cited

U.S. PATENT DOCUMENTS

| | | | | |
|---|---|---|---|---|
| 5,263,097 A | * | 11/1993 | Katz et al. | 706/10 |
| 5,737,723 A | * | 4/1998 | Riley et al. | 704/243 |
| 5,754,681 A | * | 5/1998 | Watanabe et al. | 704/231 |
| 6,108,628 A | * | 8/2000 | Komori et al. | 704/238 |
| 6,327,581 B1 | * | 12/2001 | Platt | 706/12 |

OTHER PUBLICATIONS

Chittineni et al ("On the Maximization of Divergence in Pattern Recognition—Correspondence", IEEE Transactions on Information Theory, Sep. 1976).*

Guorong et al ("Bhattacharyya Distance Feature Selection", Proceedings of the 13th International Conference on Pattern Recognition, Aug. 1996).*
Wang et al ("Classification Of Discrete Data With Feature Space Transformation", IEEE Transactions on Automatic Control, Jun. 1979).*
R. Haeb-Umbach, et al., "Linear Discrinminanat Analysis For Improved Large Vocabulary Continuous Speech Recognition", 1992, Proceedings of ACASSP.
N. Kumar, et al., "Heteroscedastic discriminant analysis and reduced rank HMMs for imroved speech recognition", 1998, Speech Communication, 26:283-297.
G. Saon, et al., "Maximum Likelihood Discriminant Feature Spaces", 2000, Proceedings of ICASSP '2000, Istanbul.
H. Decell, et al., "An Iterative Approach to the Feature Selection Problem", 1972, Proc. Purdue Univ. Conf. on Machine Processing of Remotely Sensed Data, 3B1-3B12.
M. Padmanabhan, et al., "Recent Improvements in Voicemail Transcription", 1999, Proceedings of EUROSPEECH'99, Budapest, Hungary.

* cited by examiner

*Primary Examiner*—Qi Han
(74) *Attorney, Agent, or Firm*—Ference & Associates LLC

(57) ABSTRACT

In connection with speech recognition, the design of a linear transformation $\theta \in \Re^{p \times n}$, of rank pxn, which projects the features of a classifier $x \in \Re^n$ onto $y = \theta x \in \Re^p$ such as to achieve minimum Bayes error (or probability of misclassification). Two avenues are explored: the first is to maximize the $\theta$-average divergence between the class densities and the second is to minimize the union Bhattacharyya bound in the range of $\theta$. While both approaches yield similar performance in practice, they outperform standard linear discriminant analysis features and show a 10% relative improvement in the word error rate over known cepstral features on a large vocabulary telephony speech recognition task.

10 Claims, 3 Drawing Sheets

MINIMUM BAYES ERROR FEATURE SELECTION IN SPEECH RECOGNITION

This invention was made with Government support under MDA972-97-C-0012 contract no. awarded by DARPA. The Government has certain rights in this invention.

FIELD OF THE INVENTION

The present invention relates to speech recognition and to methods and apparatus for facilitating the same.

BACKGROUND OF THE INVENTION

Modern speech recognition systems use cepstral features characterizing the short-term spectrum of the speech signal for classifying frames into phonetic classes. Cepstral features are features that are typically obtained through an orthogonal transformation (such as a discrete cosine transform) of short-term spectral features. These cepstral features are augmented with dynamic information from the adjacent frames to capture transient spectral events in the signal. What is commonly referred to as MFCC+Δ+ΔΔ features include "static" mel-frequency cepstral coefficients (usually 13) plus their first and second order derivatives computed over a sliding window of typically 9 consecutive frames yielding 39-dimensional feature vectors every IOms. One major drawback of this front-end scheme is that the same computation is performed regardless of the application, channel conditions, speaker variability, etc. In recent years, an alternative feature extraction procedure based on discriminant techniques has emerged, wherein the consecutive cepstral frames are spliced together forming a supervector which is then projected down to a manageable dimension. One of the better known objective functions for designing the feature space projection is linear discriminant analysis (LDA).

LDA, as discussed in Duda et al., "Pattern classification and scene analysis" (Wiley, New York, 1973) and Fukunaga, "Introduction to statistical pattern recognition" (Academic Press, New York, 1973), is a standard technique in statistical pattern classification for dimensionality reduction with a minimal loss in discrimination. Its application to speech recognition has shown consistent gains for small vocabulary tasks and mixed results for large vocabulary applications (see Haeb-Umbach et al., "Linear Discriminant Analysis for improved large vocabulary continuous speech recognition", Proceedings of ICASSP '92, and Kumar et al., "Heteroscedastic discriminant analysis and reduced rank HMM's (Hidden Markov Models) for improved speech recognition", Speech Communication, 26:283-297, 1998). Recently, there has been an interest in extending LDA to heteroscedastic discriminant analysis (HDA) by incorporating the individual class covariances in the objective function (see Kumar et al., supra, and Saon et al., "Maximum likelihood discriminant feature spaces", Proceedings of ICASSP '2000, Istanbul, 2000). Indeed, the equal class covariance assumption made by LDA does not always hold true in practice making the LDA solution highly suboptimal for specific cases (see Saon et al., supra).

However, since both LDA and HDA are heuristics, they do not guarantee an optimal projection in the sense of a minimum Bayes classification error (i.e., a minimum probability of misclassification). A need has thus been recognized in connection with selecting features on the basis of a minimum probability of misclassification.

SUMMARY OF THE INVENTION

In view of the foregoing, the present invention, in accordance with at least one presently preferred embodiment, broadly contemplates employing feature space projections according to objective functions which are more intimately linked to the probability of misclassification. More specifically, the probability of misclassification in the original space, $\epsilon$, will be defined, as well as in the projected space, $\epsilon_\theta$, while conditions will be given under which $\epsilon_\theta = \epsilon$. Since after a projection $y = \theta x$ discrimination information is usually lost, the Bayes error in the projected space will always increase, that is $\epsilon_\theta \geq \epsilon$. Therefore, minimizing $\epsilon_\theta$ amounts to finding $\theta$ for which the equality case holds.

An alternative approach is to define an upper bound on $\epsilon_\theta$ and to directly minimize this bound.

In summary, one aspect of the present invention provides a method of providing pattern recognition, the method comprising the steps of: inputting a pattern; transforming the input pattern to provide a set of at least one feature for a classifier; the transforming step comprising the step of minimizing the probability of subsequent misclassification of the at least one feature in the classifier; the minimizing step comprising: developing an objective function; and optimizing the objective function through gradient descent.

Another aspect of the invention provides apparatus for providing pattern recognition, the apparatus comprising: an input interface for inputting a pattern; a transformer for transforming the input pattern to provide a set of at least one feature for a classifier; the transformer being adapted to minimize the probability of subsequent misclassification of the at least one feature in the classifier; the transformer further being adapted to: develop an objective function; and optimize the objective function through gradient descent.

Furthermore, an additional aspect of the present invention provides a program storage device readable by machine, tangibly embodying a program of instructions executable by the machine to perform method steps for providing pattern recognition, the method comprising the steps of: inputting a pattern; transforming the input pattern to provide a set of at least one feature for a classifier; the transforming step comprising the step of minimizing the probability of subsequent misclassification of the at least one feature in the classifier; the minimizing step comprising: developing an objective function, and optimizing the objective function through gradient descent.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
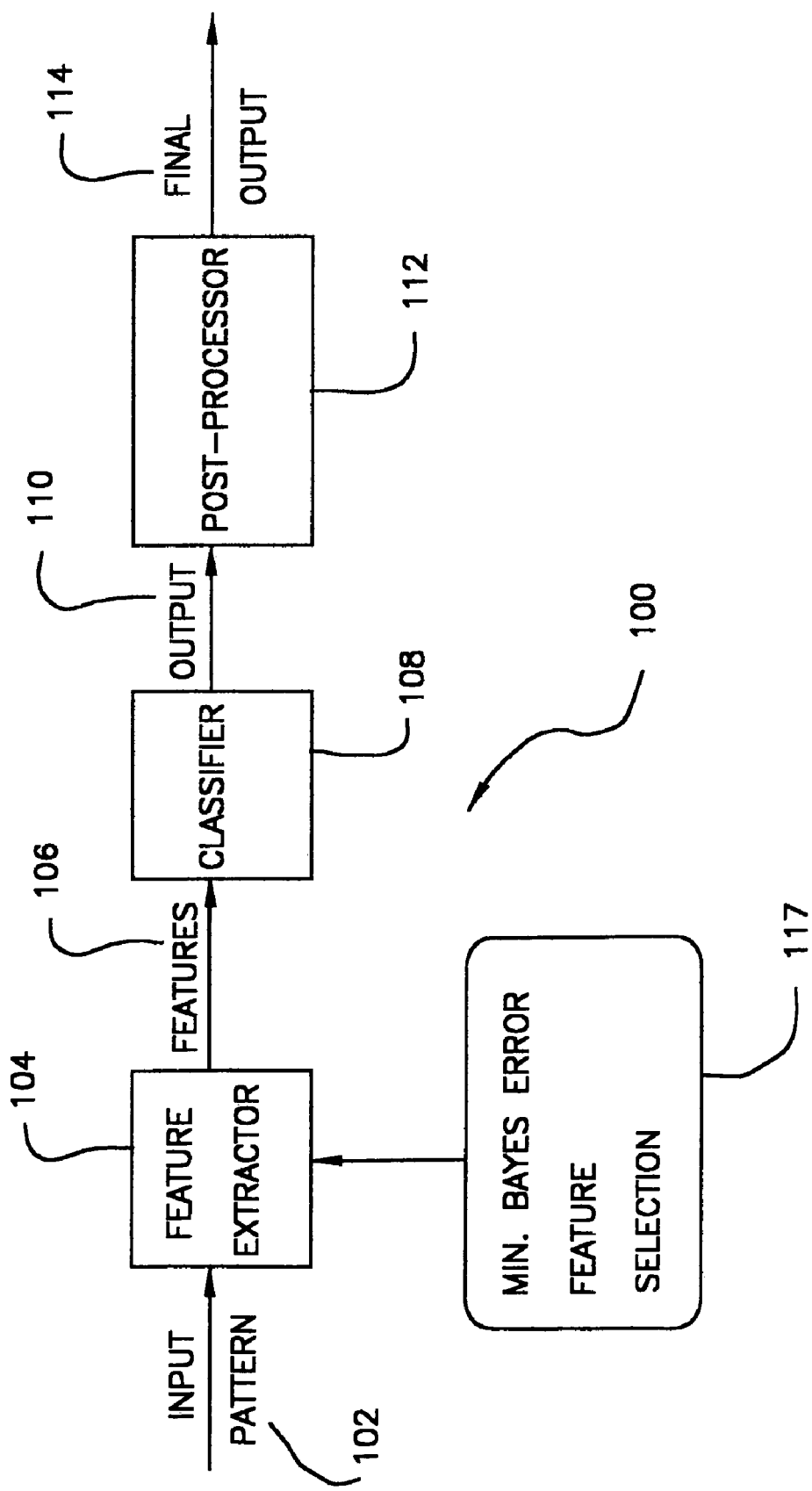
FIG. 1 schematically illustrates a general pattern recognition arrangement.

FIG. 1 illustrates a general arrangement 100, such as a speech recognition arrangement, in which an input pattern 102, such as a spoken utterance, enters a feature extractor 104, from which features 106 will progress to a classifier 108. The output 110 of classifier 108 will go into a post-processor 112, from which the final output 114 emerges. The makeup and function of a feature extractor, classifier and post-processor are generally well-known to those of ordinary skill in the art. Duda et al., supra, provides a good background discussion of these and other general concepts that may be employed in accordance with at least one presently preferred embodiment of the present invention.

Towards extracting features from extractor 104, the present invention broadly contemplates the use of minimum Bayes error feature selection, indicated schematically at 117, and as will be elucidated upon herebelow.

Figure 2:
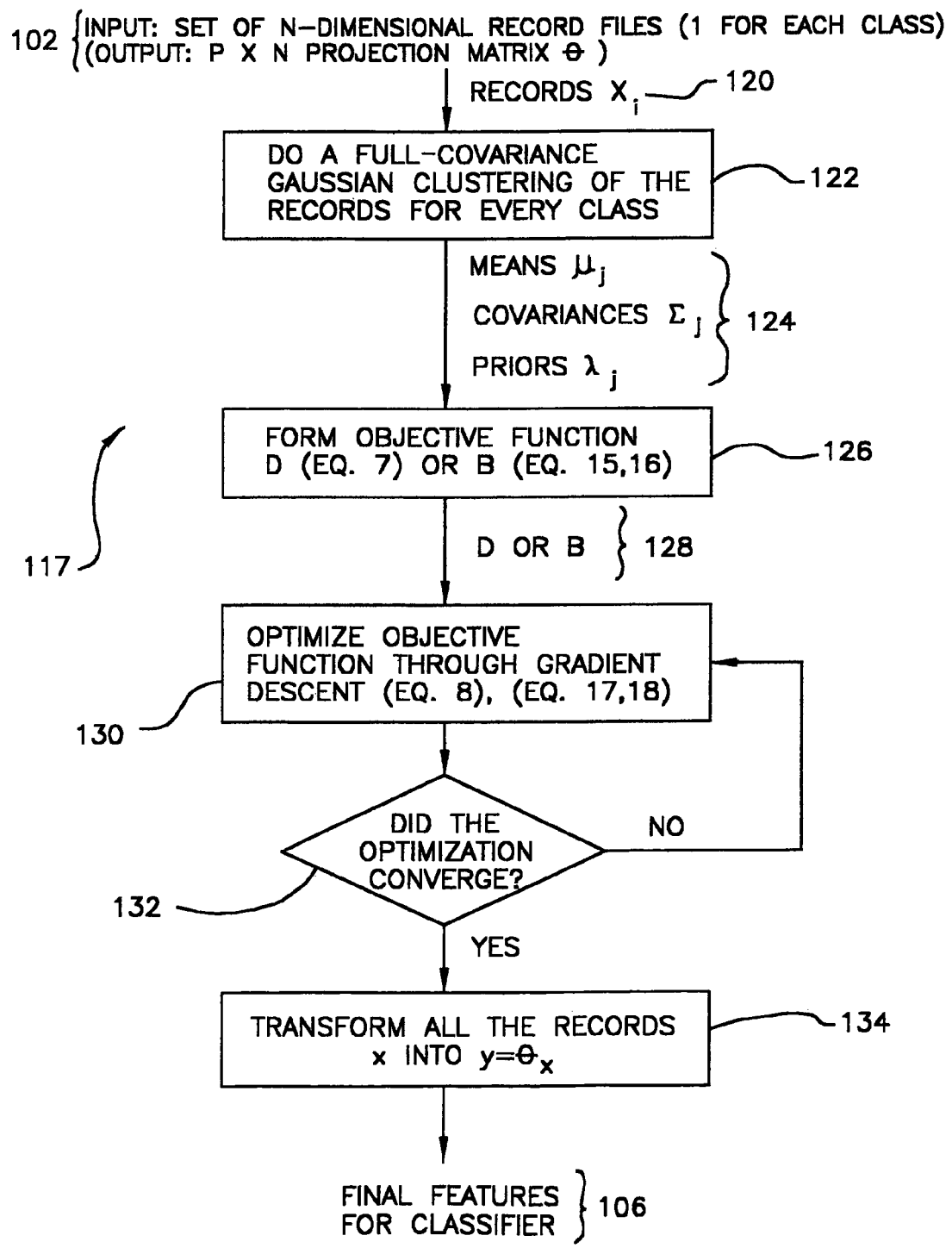
FIG. 2 schematically sets forth a method of minimum Bayes error feature selection.

Reference is made immediately herebelow and throughout to FIG. 2, which schematically illustrates a method for providing minimum Bayes error feature selection.

With regard to Bayes error, one may first consider the general problem of classifying an n-dimensional vector x (input 102) into one of C distinct classes. Records (120) are input and a full-covariance Gaussian clustering of the records is undertaken for every class (122). By way of means, covariances and priors (124), an objective function is formed (126), and the objective function is preferably optimized through gradient descent (130). If the optimization converges (132), then all of the records x are transformed into y=qx, and the resulting output (134) represents the final features for the classifier 108 (see FIG. 1).

This portion of the disclosure first addresses the Bayes error rate and its link to the divergence and the Bhattacharyya bound, as well as general considerations relating to minimum Bayes error feature selection.

Let each class i be characterized by its own "prior" (i.e., prior probability) $\lambda_i$ and probability density function $p_i$, i=1, ..., C. Assume that x is classified as belonging to class j through the Bayes assignment:

$$j = \text{argmax}_{1 \le i \le C} \lambda_i p_i(x) dx.$$

The expected error for this classifier is called Bayes error (see Fukunaga, supra), or probability of misclassification, and is defined as $$\varepsilon = 1 - \int_{R^n} \max_{1 \le i \le Cq} \lambda_i p_i(x) dx \quad (1)$$

Suppose next that the linear transformation $f: \Re^n \to \Re^p$, $y = f(x) = \theta x$ is performed, with $\theta$ being a p×n matrix of rank $p \le n$. Moreover, one may denote by $p_i^\theta$ the transformed density for class i. The Bayes error in the range of $\theta$ now becomes $$\varepsilon = 1 - \int_{R^p} \max_{1 \le i \le C} \lambda_i p_i^\theta(y) dy \quad (2)$$

Since the transformation $y = \theta x$ produces a vector whose coefficients are linear combinations of the input vector x, it can be shown (see Decell et al., "An iterative approach to the feature selection problem", Proc. Purdue Univ. Conf. On Machine Processing of Remotely Sensed Data, 3B1-3B12, 1972) that, in general, information is lost and $\epsilon_\theta \ge \epsilon$.

For a fixed p, the feature selection problem can be stated as finding $\hat{\theta}$ such that $$\hat{\theta} = \underset{\theta \in R^{p \times n}, \text{rank}(\theta) = p}{\text{argmin}} \; \varepsilon_\theta \quad (3)$$

However, an indirect approach to equation (3) is now contemplated: by maximizing the average pairwise divergence and relating it to $\epsilon_\theta$ and by minimizing the union Bhattacharyya bound on $\epsilon_\theta$.

In Kullback, "Information theory and statistics" (Wiley, New York, 1968), the symmetric divergence between class i and j is given by $$D(i, j) = \int_{\R^n} p_i(x) \log \frac{p_i(x)}{p_j(x)} + p_j(x) \log \frac{p_j(x)}{p_i(x)} dx \quad (4)$$

D(i,j) represents a measure of the degree of difficulty of discriminating between the classes (the larger the divergence, the greater the separability between the classes). Similarly, one can define $D_\theta(i,j)$, the pairwise divergence in the range of $\theta$. Kullback, supra, showed that $D_\theta(i,j) | D(i,j)$. If the equality case holds, then $\theta$ is called a "sufficient statistic for discrimination." The average pairwise divergence is defined as $$D = \frac{2}{c(c-1)} \sum_{1 \le i \le j \le C} D(i, j)$$

and respectively $$D_\theta = \frac{2}{c(c-1)} \sum_{1 \le i \le j \le C} D_\theta(i, j).$$

It follows that $D_\theta \le D$.

The following theorem, from Decell et al., supra, provides a link between Bayes error and divergence for classes with uniform priors $\lambda_1 = \ldots = \lambda_c (=1/C)$:

Theorem: If $D_\theta = D$ then $\epsilon_\theta = \epsilon$.

The main idea of the proof of the above theorem is to show that if the divergences are the same then the Bayes assignment is preserved because the likelihood ratios are preserved almost everywhere:

$$\frac{p_i(x)}{p_j(x)} = \frac{p_i^\theta(x)}{p_j^\theta(x)}, i \ne j.$$

The result follows by noting that for any measurable set $A \subset \Re^p$ $$\int_A p_i^\theta(y) dy = \int_{\theta^{-1}(A)} p_i(x) dx \quad (5)$$

where $\theta^{-1}(A) = \{x \in \Re^n | \theta x \in A\}$. The previous theorem provides a basis for selecting $\theta$ such as to maximize $D_\theta$.

The assumption may now be made that each class i is normally distributed with mean $\mu_i$ and covariance $\Sigma_i$, that is, $p_i(x)=N(x; \mu_i, \Sigma_i)$ and $p_i^\theta(y)=N(y; \theta\mu_i, \theta\Sigma_i\theta^T)$, $i=1, \ldots, C$. It is straightforward to show that, in this case, the divergence is given by $$D(i,j) = \frac{1}{2}\mathrm{trace}\left\{\sum_{i}^{-1}\left[\sum_{j}+(\mu_i-\mu_j)(\mu_i-\mu_j)^T\right]+ \sum_{j}^{-1}\left[\sum_{i}+(\mu_i-\mu_j)(\mu_i-\mu_j)^T\right]\right\} - n \qquad (6)$$

Thus, the objective function to be maximized becomes $$D_\theta = \frac{1}{C(C-1)}\mathrm{trace}\left\{\sum_{i=1}^{C}\left(\theta\sum_{i}\theta^T\right)^{-1}\theta S_i\theta^T\right\} - p \qquad (7)$$

where $$S_i = \sum_{j\neq i}\sum_{j}+(\mu_i-\mu_j)(\mu_i-\mu_j)^T, i=1, \ldots, C.$$

Following matrix differentiation results from Searle, "Matrix algebra useful for statistics" (Wiley Series in Probability and Mathematical Statistics, New York, 1982), $D_\theta$ (indicated at 128 in FIG. 2) has a gradient with respect to $\theta$ and has the expression $$\frac{\partial D_\theta}{\partial \theta} = \frac{1}{C(C-1)}\sum_{i=1}^{C}\left(\theta\sum_{i}\theta^T\right)^{-1}\left[\theta S_i\theta^T\left(\theta\sum_{i}\theta^T\right)^{-1}\theta\sum_{i}-\theta S_i\right] \qquad (8)$$

The use of equation (8) is indicated in FIG. 2 at 130. Unfortunately, it turns out that $$\frac{\partial D_\theta}{\partial \theta} = 0$$

has no analytical solutions for the stationary points. Instead, one has to use numerical optimization routines for the maximization of $D_\theta$.

An alternative way of minimizing the Bayes error is to minimize an upper bound on this quantity. First, the following statement will be proven:

$$\varepsilon \leq \sum_{1\leq i\leq j\leq C}\sqrt{\lambda_i\lambda_j}\int_{\mathbb{R}^n}\sqrt{p_i(x)p_j(x)}\,dx \qquad (9)$$

Indeed, from Decell et al., supra, the Bayes error can be rewritten as $$\varepsilon = \int_{\mathbb{R}^n}\sum_{i=1}^{C}\lambda_i p_i(x)dx - \int_{\mathbb{R}^n}\max_{1\leq i\leq C}\lambda_i p_i(x)dx \qquad (10)$$

$$= \int_{\mathbb{R}^n}\min_{1\leq i\leq C}\sum_{j\neq i}\lambda_j p_j(x)dx$$

and for every x, there exists a permutation of the indices $\sigma_x$: $\{1, \ldots, C\}\to\{1, \ldots, C\}$ such that the terms $\lambda_1 p_1(x), \ldots, \lambda_C p_C(x)$ are sorted in increasing order, i.e. $\lambda_{\sigma_x(1)} p_{\sigma_x(1)}(x) \leq \ldots \leq \lambda_{\sigma_x(C)} p_{\sigma_x(C)}(x)$. Moreover, for $1\leq k\leq C-1$ $$\lambda_{\sigma_x(k)} p_{\sigma_x(k)}(x) \leq \sqrt{\lambda_{\sigma_x(k)} p_{\sigma_x(k)}(x)\lambda_{\sigma_x(k+1)} p_{\sigma_x(k+1)}(x)} \qquad (11)$$

from which it follows that $$\min_{1\leq i\leq C}\sum_{j\neq i}\lambda_i p_j(x) = \sum_{k=1}^{C-1}\lambda_{\sigma_x(k)} p_{\sigma_x(k)}(x) \leq \qquad (12)$$

$$\sqrt{\lambda_{\sigma_x(k)} p_{\sigma_x(k)}(x)\lambda_{\sigma_x(k+1)} p_{\sigma_x(k+1)}(x)} \leq$$

$$\sum_{1\leq i\leq j\leq C}\sqrt{\lambda_i p_i(x)\lambda_j p_j(x)}$$

which, when integrated over $\mathbb{R}^n$, leads to equation (9).

As previously, if it is assumed that the $p_i$'s are normal distributions with means $\mu_i$ and covariances $\Sigma_i$, the bound given by the right-hand side of equation (9) has the closed form expression $$\sum_{1\leq i\leq j\leq C}\sqrt{\lambda_i\lambda_j}\,e^{-\rho(i,j)} \qquad (13)$$

where $$\rho(i,j) = \frac{1}{8}(\mu_i-\mu_j)^T\left[\frac{\sum_i+\sum_j}{2}\right]^{-1}(\mu_i-\mu_j) + \frac{1}{2}\log\frac{\left|\frac{\sum_i+\sum_j}{2}\right|}{\sqrt{|\Sigma_i||\Sigma_j|}} \qquad (14)$$

is called the Bhattacharyya distance between the normal distributions $p_i$ and $p_j$ (see Fukunaga, supra). Similarly, one can define $\rho_\theta(i,j)$, the Bhattacharyya distance between the projected densities $p_i^\theta$ and $p_j^\theta$. Combining equations (9) and (13), one obtains the following inequality (indicated in FIG. 2 at 126) involving the Bayes error rate in the projected space:

$$\varepsilon_\theta \leq \sum_{1\leq i\leq j\leq C}\sqrt{\lambda_i\lambda_j}\,e^{-\rho_\theta(i,j)}(=B_\theta) \qquad (15)$$

The following simplifying notations will now be introduced:

$$B_{ij} = \frac{1}{4}(\mu_i - \mu_j)(\mu_i - \mu_j)^T \text{ and}$$

$$W_{ij} = \frac{1}{2}\left(\sum_i + \sum_j\right), \ 1 \le i \le j \le C.$$

From equation (14), it follows that:

$$p_\theta(i, j) = \frac{1}{2}\text{trace}\{(\theta W_{ij}\theta^T)^{-1}\theta B_{ij}\theta^T\} + \frac{1}{2}\log\frac{|\theta W_{ij}\theta^T|}{\sqrt{\left|\theta\sum_i\theta^T\right|\left|\theta\sum_j\theta^T\right|}} \quad (16)$$

(indicated in FIG. 2 at 126) and the gradient of $B_\theta$ (indicated in FIG. 2 at 128) with respect to θ is $$\frac{\partial B_\theta}{\partial \theta} = -\sum_{1 \le i \le j \le C} \sqrt{\lambda_i \lambda_j} \ e^{-p_\theta(i,j)} \frac{\partial p_\theta(i, j)}{\partial \theta} \quad (17)$$

(indicated in FIG. 2 at 130) with, again by making use of differentiation results from Searle, supra $$\frac{\partial p_\theta(i, j)}{\partial \theta} = \frac{1}{2}(\theta W_{ij}\theta^T)^{-1}\left[\theta B_{ij}\theta^T(\theta W_{ij}\theta^T)^{-1}\theta W_{ij} - \theta B_{ij}\right] + \quad (18)$$

$$(\theta W_{ij}\theta^T)^{-1}\theta W_{ij} - \frac{1}{2}\left[\left(\theta\sum_i\theta^T\right)^{-1}\theta\sum_i + \left(\theta\sum_j\theta^T\right)^{-1}\theta\sum_j\right]$$

The use of equation (18) is indicated in FIG. 2 at 130.

In connection with the foregoing discussion, speech recognition experiments were conducted on a voicemail transcription task (see Padmanabhan et al., "Recent improvements in voicemail transcription", Proceedings of EUROSPEECH '99, Budapest, Hungary, 1999).

The baseline system had 2.3 K context dependent HMM states and 134K diagonal Gaussian mixture components and was trained on approximately 70 hours of data. The test set consisted of 86 messages (approximately 7000 words). The baseline system used 39-dimensional frames (13 cepstral coefficients plus deltas and double deltas computed from 9 consecutive frames). For the divergence and Bhattacharyya projections, every 9 consecutive 24-dimensional cepstral vectors were spliced together forming 216-dimensional feature vectors which were then clustered to estimate one full covariance Gaussian density for each state. Subsequently, a 39×216 transformation θ was computed using the objective functions for the divergence (equation [7]) and the Bhattacharyya bound (equation [15]), which projected the models and feature space down to 39 dimensions.

As mentioned in Haeb-Umbach et al, supra, it is not clear what the most appropriate class definition for the projections should be. The best results were obtained by considering each individual HMM state as a separate class, with the priors of the Gaussians summing up to one across states. Both optimizations were initialized with the LDA matrix and carried out using a conjugate gradient descent routine with user supplied analytic gradient from the NAG (Numerical Algebra Group) Fortran library. (The NAG Fortran library is a collection of mathematical subroutines—or subprograms—for performing various scientific/mathematical computations such as: solving systems of linear or non-linear equations, function integration, differentiation, matrix operations, eigensystem analysis, constrained or unconstrained function optimization, etc.)

The routine performs an iterative update of the inverse of the Hessian of the objective function by accumulating curvature information during the optimization.

Figure 3:
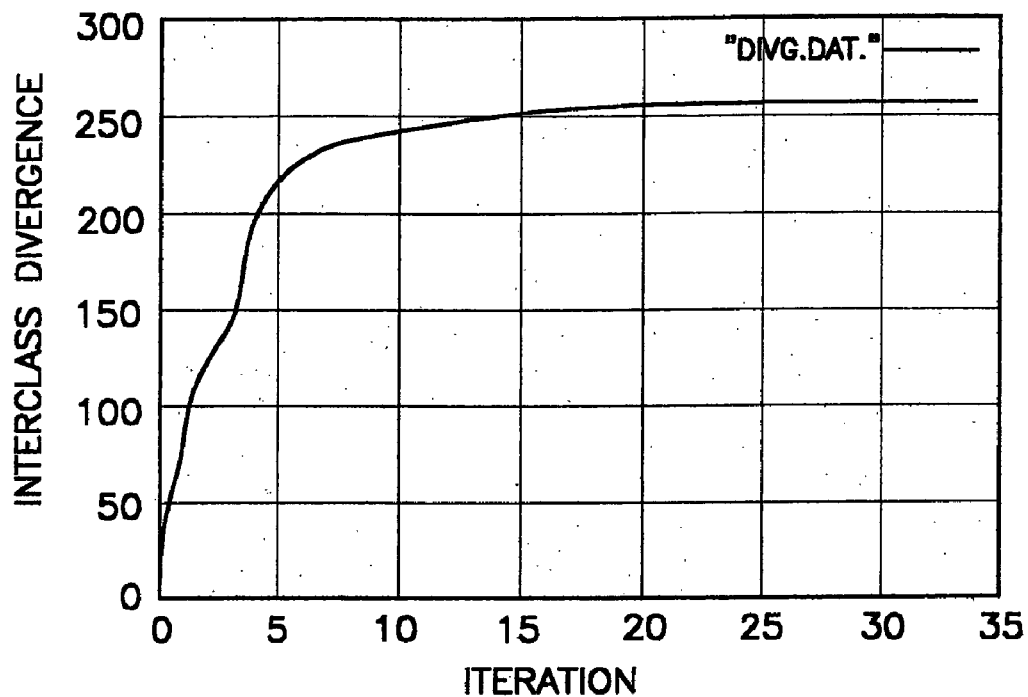
FIG. 3 illustrates the evolution of objective functions for divergence.
Figure 4:
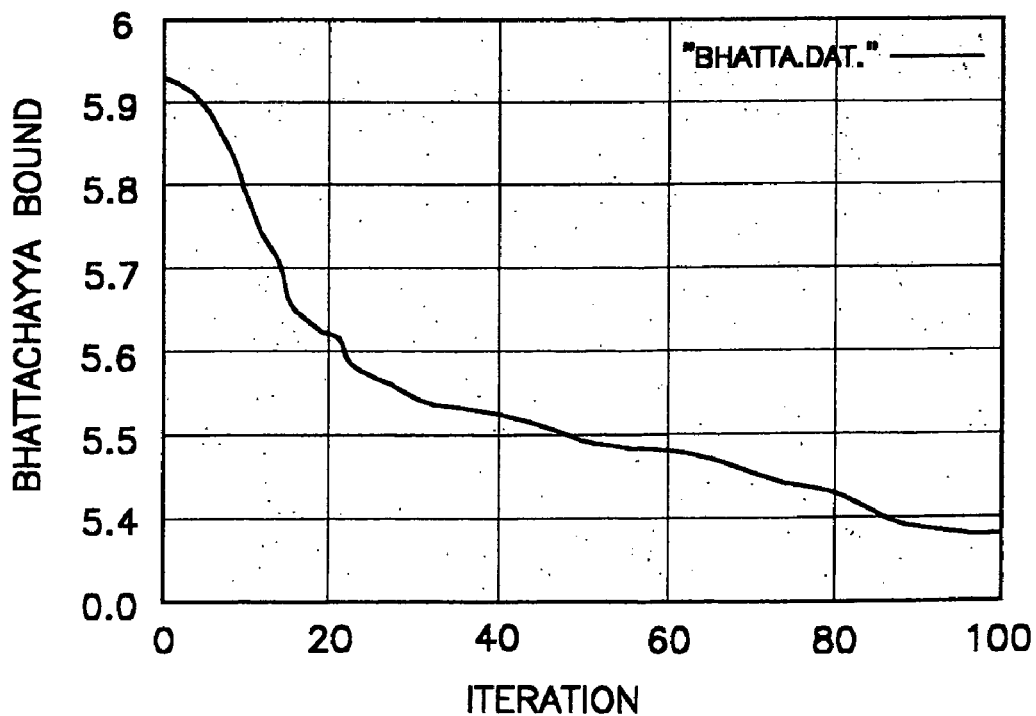
FIG. 4 illustrates the evolution of objective functions for the Bhattacharyya bound.

FIG. 3 illustrates the evolution of objective functions for divergence, while FIG. 4 illustrates the evolution of objective functions for the B Bhattacharyya bound.

The parameters of the baseline system (with 134K Gaussians) were then re-estimated in the transformed spaces using the EM algorithm. Table 1 summarizes the improvements in the word error rates for the different systems.

TABLE 1

| System | Word Error Rate |
|---|---|
| Baseline (MFCC + Δ + ΔΔ) | 39.61% |
| LDA | 37.39% |
| Interclass divergence | 36.32% |
| Bhattacharyya bound | 35.73% |

In recapitulation, two methods for performing discriminant feature space projections have been presented. Unlike LDA, they both aim to directly minimize the probability of misclassification in the projected space by either maximizing the interclass divergence and relating it to the Bayes error or by directly minimizing an upper bound on the classification error. Both methods lead to defining smooth objective functions which have as argument projection matrices and which can be numerically optimized. Experimental results on large vocabulary continuous speech recognition over the telephone show the superiority of the resulting features over their LDA or cepstral counterparts.

Some primary applications of the methods and arrangements discussed herein relate to pattern recognition, including speech recognition. Other examples of pattern recognition, which may make use of the embodiments of the present invention, include but are not limited to: handwriting and optical character recognition (OCR), speaker identification and verification, signature verification (for security applications), object recognition and scene analysis (such as aircraft identification based on aerial photographs), crops monitoring, submarine identification based on acoustic signature, and several others.

It is to be understood that the present invention, in accordance with at least one presently preferred embodiment, includes an input interface for inputting a pattern and a transformer for transforming the input pattern to provide a set of at least one feature for a classifier. Together, the input interface and transformer may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing pattern recognition, said method comprising the steps of:
inputting a speech pattern into a pattern recognition apparatus;
providing minimum Bayes error feature selection via transforming the input pattern to provide a set of features for a classifier which classifies into classes, wherein there is only one feature space transformation for all classes; and
providing final features to the classifier, wherein the classifier provides a final output classification result;
said transforming step comprising the step of directly minimizing the probability of subsequent misclassification in a projected space of at least one feature; said direct minimizing step comprising:
performing a full-covariance gaussian clustering of input records for every class;
developing an objective function by way of means, covariances and priors, wherein said objective function either:
maximizes an average pairwise divergence and relates it to Bayes error; or
directly minimizes an upper bound on Bayes error;
optimizing the objective function through gradient decent, wherein all dimensions of a matrix are optimized via optimizing the objective function;
wherein the optimizing is carried out over all possible matrices; and
wherein the objective function is initialized with an LDA matrix (linear discriminant analysis);
upon convergence of the optimization, transforming all the records x into y=θx to produce the at least one final feature where θ is the LDA matrix;
wherein said pattern recognition is speech recognition.

2. The method of claim 1, further comprising the step of querying whether the optimized objective function converges.

3. The method according to claim 2, further comprising the step of repeating said optimizing step if the optimized objective function does not converge.

4. The method according to claim 1, wherein said objective function is an average pairwise divergence related to the probability of misclassification of a projected space based on classes having uniform prior probabilities.

5. The method according to claim 1, wherein said objective function comprises means, covariances, and prior probabilities.

6. The method according to claim 1, wherein said objective function is expressed by the following equation:

$$D_\theta = \frac{1}{C(C-1)} \text{trace}\left\{\sum_{i=1}^{C} (\theta \Sigma_i \theta^T)^{-1} \theta S_i \theta^T\right\} - p$$

where $$S_i = \sum_{j \neq i} \Sigma_j + (\mu_i - \mu_j)(\mu_i - \mu_j)^T, \, i = 1, \ldots, C.$$

7. An apparatus for providing pattern recognition, said apparatus comprising:
an input interface for inputting a speech pattern;
a transformer for providing minimum Bayes error feature selection via transforming the input pattern to provide a set of features for a classifier which classifies into classes, wherein there is only one feature space transformation for all classes; and
a classifier for producing a final output classification result upon being provided final features;
said transformer being adapted to directly minimize the probability of subsequent misclassification in a projected space of at least one feature in the classifier;
said transformer further being adapted to:
perform a full-covariance gaussian clustering of input records for every class;
develop an objective function by way of means, covariances and priors, wherein said objective function either:
maximizes an average pairwise divergence and relates it to Bayes error; or
directly minimizes an upper bound on Bayes error; and
optimize the objective function through gradient decent, wherein all dimensions of a matrix are optimized via optimizing the objective function;
wherein the optimizing is carried out over all possible matrices; and
wherein the objective function is initialized using an LDA matrix (linear discriminant analysis);
upon convergence of the optimization, transform all the records x into y=θx to produce final features where θ is the LDA matrix;
wherein the apparatus utilizes a processor to provide pattern recognition; and
wherein said pattern recognition is speech recognition.

8. The apparatus according to claim 7, wherein said transformer is further adapted to query whether the optimized objective function converges.

9. The apparatus according to claim 8, wherein said transformer is further adapted to repeat optimization of the objective function if the optimized objective function does not converge.

10. A program storage device readable by machine, tangibly embodying a program of instructions executable by the machine to perform method steps for providing pattern recognition, said method comprising the steps of:
inputting a speech pattern;
utilizing a processor to provide minimum Bayes error feature selection via transforming the input pattern to provide a set of features for a classifier which classifies into classes, wherein there is only one feature space transformation for all classes; and
providing final features to the classifier, wherein the classifier utilizes a processor to provide a final output classification result;
said transforming step comprising the step of directly minimizing the probability of subsequent misclassification in a projected space of the at least one feature; said direct minimizing step comprising:
performing a full-covariance gaussian clustering of input records for every class;
developing an objective function by way of means, covariances and priors, wherein said objective function either:
maximizes an average pairwise divergence and relates it to the Bayes error; or directly minimizes an upper bound on Bayes error;
optimizing the objective function through gradient decent, wherein all dimensions of a matrix are optimized via optimizing the objective function;
wherein the optimizing is carried out over all possible matrices; and
wherein the objective function is initialized with an LDA matrix (linear discriminant analysis);
upon convergence of the optimization, transforming all the records x into y=θx to produce the at least one final feature where θ is the LDA matrix;
wherein said pattern recognition is speech recognition.

* * * * *